US009678939B2

(12) United States Patent
Bahgat et al.

(10) Patent No.: US 9,678,939 B2
(45) Date of Patent: Jun. 13, 2017

(54) MORPHOLOGY ANALYSIS FOR MACHINE TRANSLATION

(71) Applicant: International Business Machines Corporation, Armonk, NY (US)

(72) Inventors: Mohamed A. Bahgat, Giza (EG); Ossama Emam, Giza (EG); Ayman S. Hanafy, Giza (EG); Sara A. Noeman, Giza (EG)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 14/096,170

(22) Filed: Dec. 4, 2013

(65) Prior Publication Data

US 2015/0154184 A1    Jun. 4, 2015

(51) Int. Cl.
*G06F 17/28*    (2006.01)
*G06F 17/20*    (2006.01)
(Continued)

(52) U.S. Cl.
CPC ........ *G06F 17/271* (2013.01); *G06F 17/2755* (2013.01); *G06F 17/2872* (2013.01); *G06F 17/2715* (2013.01)

(58) Field of Classification Search
CPC .... G06F 17/271; G06F 17/27; G06F 17/2755; G06F 17/28; G06F 17/2836;
(Continued)

(56) References Cited

U.S. PATENT DOCUMENTS 5,490,061 A * 2/1996 Tolin ................... G06F 17/2755
704/2
6,275,789 B1 * 8/2001 Moser ................... G06F 17/271
704/2
(Continued)

FOREIGN PATENT DOCUMENTS

CN    102945232 A    2/2013

OTHER PUBLICATIONS

Ueffing et al., "Using POS Information for Statistical Machine Translation into Morphologically Rich Languages," In EACL, 2003: Proceedings of the Tenth Conference on European Chapter of the Association for Computational Linguistics, pp. 347-354.*
(Continued)

*Primary Examiner* — Michael Ortiz Sanchez
(74) *Attorney, Agent, or Firm* — Jay Wahlquist

(57) ABSTRACT

A method and system for analyzing language morphology to facilitate statistical machine translation from a first language to a target language is disclosed. The method and system can include marking words in a first language text with a part-of-speech tag, and parsing one or more sentences in the first language text to determine syntactic dependence relations between the words in the one or more sentences of the first language text. Morphological features of the words in the first language text can also be extracted. The method and system can also include tagging the words in the first language text with a language morphology tag from a second language. A modified form of words in the first language text can be generated using the language morphology tags from the second language. The modified form of the words can be used to facilitate translation from the first language to a target language.

12 Claims, 4 Drawing Sheets

FIG. 1

(51) Int. Cl.
*G06F 17/21* (2006.01)
*G06F 17/27* (2006.01)

(58) Field of Classification Search
CPC ............. G06F 17/289; G06F 17/30705; G06F 17/2818; G10L 15/1822; G10L 15/193; G06K 9/00442
USPC ....................................................... 704/1–10
See application file for complete search history.

(56) References Cited

U.S. PATENT DOCUMENTS

| | | | | |
|---|---|---|---|---|
| 6,278,967 | B1* | 8/2001 | Akers | G06F 17/271 704/2 |
| 6,349,276 | B1* | 2/2002 | McCarley | G06F 17/289 704/7 |
| 7,827,028 | B2 | 11/2010 | Miller | |
| 8,296,127 | B2 | 10/2012 | Marcu et al. | |
| 8,719,003 | B1* | 5/2014 | Chen | G06F 17/2827 704/2 |
| 2001/0056352 | A1* | 12/2001 | Xun | G06F 17/271 704/277 |
| 2003/0014238 | A1* | 1/2003 | Xun | G06F 17/271 704/4 |
| 2006/0069545 | A1* | 3/2006 | Wu | G06F 17/2705 704/8 |
| 2007/0067153 | A1 | 3/2007 | Nakagawa | |
| 2008/0208566 | A1* | 8/2008 | Alonichau | G06F 17/277 704/9 |
| 2009/0299925 | A1* | 12/2009 | Ramaswamy | G06F 21/316 706/12 |
| 2011/0161067 | A1* | 6/2011 | Lesher | G06F 17/241 704/1 |
| 2011/0178791 | A1* | 7/2011 | Stymne | G06F 17/2755 704/2 |
| 2012/0296633 | A1 | 11/2012 | Chalabi et al. | |
| 2012/0316862 | A1* | 12/2012 | Sultan | G06F 17/2755 704/4 |
| 2013/0103695 | A1 | 4/2013 | Rarrick et al. | |

OTHER PUBLICATIONS

Andryeyev, A., "Case Prediction for Morphologically Poor Languages," 7 pages.

Avramidis, E., et al., "Enriching Morphologically Poor Languages for Statistical Machine Translation," Proceedings of ACL-08: HLT, pp. 763-770, Columbus, Ohio, USA, Jun. 2008. c 2008 Association for Computational Linguistics.

Ceausu, A., et al., "Adressing SMT Data Sparseness When Translating in to Morphologically-Rich Languages," 12 pages.

Hatem, A., et al., "Morphological Analysis for Rule Based Machine Translation," 2011 International Conference on Semantic Technology and Information Retrieval Jun. 28-29, 2011, Putrajaya, Malaysia. © 2011 IEEE.

Lee, Y., "Morphological Analysis for Statistical Machine Translation," 2004. 6 pages.

Minkov, E., et al., "Generating Complex Morphology for Machine Translation," 8 pages.

Sultan, S., "Applying Morphology to English-Arabic Statistical Machine Translation," ETH Zurich and Google, Inc., Dec. 2010-May 2011. 65 pages.

Toutanova, K., et al., "Applying Morphology Generation Models to Machine Translation," Microsoft, Proceedings of ACL-08: HLT, pp. 514-522, Columbus, Ohio, USA, Jun. 2008. c 2008 Association for Computational Linguistics.

* cited by examiner

MORPHOLOGY ANALYSIS FOR MACHINE TRANSLATION

TECHNICAL FIELD

This disclosure relates generally to computer systems having knowledge bases, and more specifically, relates to systems, methods and computer programs for translation.

BACKGROUND

Machine translation is the process of translating, for example by a computer system, from a first language to another language. In linguistics, morphology is the identification, analysis, and description of the structure of a language's fundamental linguistic units, such as root words, gender, plurality, affixes, parts of speech, intonation/stress, and implied context. Morphological differences between languages can be relevant to the machine translation process.

SUMMARY

Aspects of the present disclosure are directed toward statistical machine translation from morphologically poor to rich language, and methods of using, that address challenges including those discussed herein, and that are applicable to a variety of applications. These and other aspects of the present disclosure are exemplified in a number of implementations and applications, some of which are shown in the figures and characterized in the claims section that follows.

Aspects of the disclosure, in certain embodiments, are directed toward a method for analyzing language morphology to facilitate statistical machine translation from a first language to a target language. In certain embodiments, the method can include marking one or more words in a first language text with a part-of-speech tag, and parsing one or more sentences in the first language text to determine syntactic dependence relations between the one or ore words in the one or more sentences of the first language text. Morphological features of the one or more words in the first language text can also be extracted. In various embodiments, the method can also include tagging the one or more words in the first language text with a language morphology tag from a second language. A modified form of the one or more words in the first language text can be generated using the language morphology tags from the second language. The modified form of the one or more words can be used to facilitate translation from the first language to a target language.

Aspects of the disclosure, in certain embodiments, are directed toward a machine translation system for mapping morphological features to a language text in a first language from a second language. In certain embodiments, the machine translation system can include a morphological analysis module configured to mark one or more words in a first language text with a part-of-speech tag. The morphological analysis module can also be configured to parse one or more sentences in the first language text to determine syntactic dependence relations between the one or more words in the one or more sentences of the source language text. The morphological analysis module can also be configured to extract morphological features of the one or more words in the first language text. In various embodiments, the machine translation system can include a morphology enrichment module configured to tag one or more words in the first language text with a language morphology tag from a second language, and generate a modified form for the one or more words tagged with a second language morphology tag.

Aspects of the disclosure, in certain embodiments, are directed toward a method for training a morphology learning system using linguistic information from a parallel bilingual corpus having a first language text portion and a second language text portion. In certain embodiments, the method includes annotating a first set of words in the first language text portion with a first language morphology tag, and a second set of words in the second language text portion with a second language morphology tag. The method can also include mapping the second language morphology tags from the second language text portion to the first set of words. In certain embodiments, the method can also include assigning a morphology classification label to the first set of words based on the first language morphology tag and the second language morphology tag. The morphology classification labels can be processed by a morphology enrichment module.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments of the invention and do not limit the disclosure.

Figure 1:
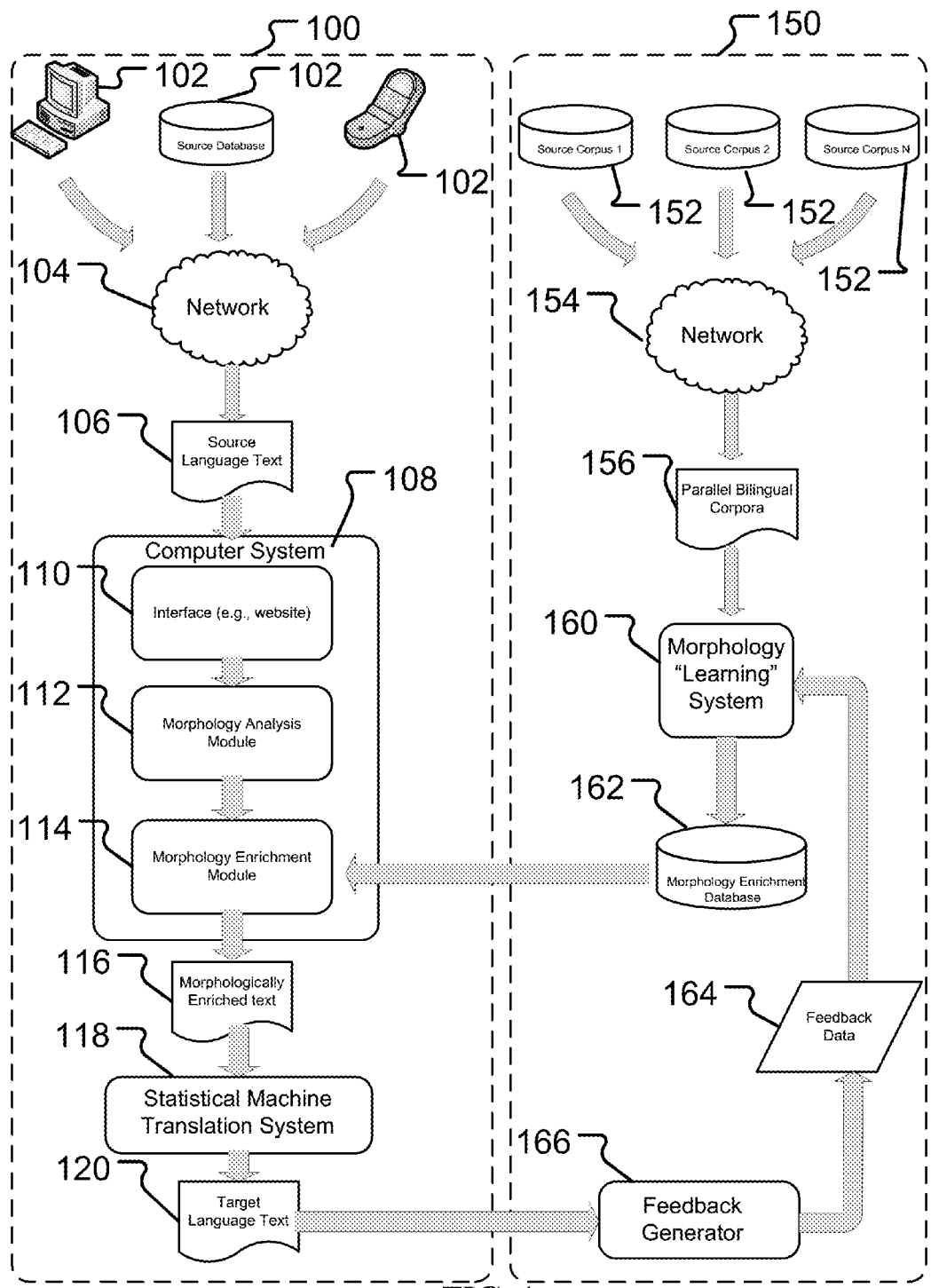
FIG. 1 depicts a high-level flow diagram for a statistical machine translation system, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods of statistical machine translation. Particular aspects relate to conversion from a morphologically poor source language to an intermediate morphologically enriched language, which will facilitate translation from the intermediate morphologically enriched language to one or more target languages. In certain embodiments, the system can include a part of speech (POS) tagger, a dependency parser, a morphology features extractor, a rich morphology tagger, and an inflection generator. Consistent with various embodiments, the system can include a method of training the rich morphology tagger. While the present invention is not necessarily limited to such applications, various aspects of the invention may be appreciated through a discussion of various examples using this context.

In linguistics, morphology is the identification, analysis, and description of the structure of a language's fundamental linguistic units. Fundamental linguistic units can include root words, gender, plurality, affixes, parts of speech, intonation/stress, and implied context. Languages can be classified as morphologically poor or rich based upon the structure and complexity of their morphological elements. Machine translation refers to a computer-implemented translation of text from a first language (referred to as a source language) to a target language. For example, in certain embodiments, machine translation may be used to translate language text from a source language (e.g., English) into a target language (e.g., Arabic). However, the grammatical, idiosyncratic, and morphological divergences between languages can pose challenges for machine translation systems, and complicate the process of acquiring quality translations. Consistent with embodiments of the present disclosure, the translation of a morphologically poor source language to an intermediate morphologically enriched language can be useful for improving the quality of statistical machine translation.

One approach to machine translation is the method of corpus based statistical translation, or statistical machine translation (SMT). SMT generates translations based on statistical models whose parameters are derived from the analysis of parallel bilingual text corpora. By comparing examples of parallel bilingual texts, the SMT system can relate words and sequences of words in a source language to those in a target language, thereby "learning" to convert from one language to another. When translating a source language sentence, a statistical decoder can combine the information in the translation model with a language model of the target language to produce a list of possible sentences in the target language ranked by confidence level.

Statistical machine translation can provide quality results when used to translate between languages with high similarity of morphological and grammatical nature, such as English and French, for example. However, SMT can encounter difficulties when used to translate text between languages that have different morphology and syntax structure, especially between comparatively poor morphological languages and comparatively rich morphological languages like English and Arabic (or Greek, German, Czech, Turkish, Finnish, Korean, Japanese, etc.). In particular, translating from a source language that is morphologically poor to a target language that is morphologically rich, comparatively, can pose significant challenges for phrase-based statistical machine translation systems. For example, in some cases, words in the target language are morphologically marked for gender and/or number, however the lack of such morphological markers in the source language can make it difficult for the SMT system to correctly generate morphological agreement in the target output.

There are a variety of reasons why generating richer morphology from comparatively poor morphology languages is more difficult than translating to poor morphology languages from rich morphology languages. In certain instances, linguistic elements necessary for complete translation to a morphologically rich language cannot be found within a morphologically poor language sentence, resulting in incorrectly translated sentences. Consider the following example of translating noun phrases from English to Arabic (where English is taken as an example of a morphologically poor language, and Arabic is taken as a representative of a grammatically and morphologically rich language). In English, a noun phrase is rendered the same if the subject is male or female. In Arabic, however, the inflection of the noun's gender and number affect other parts of the sentence, such as the verbs, adverbs, and other nouns. This can pose challenges for current phrase based statistical machine translation systems (PBSMT). For example, the parallel text of the sentence "The man went to school" can often be used by current PBSMT systems to translate "The boy went to school," as "boy" and "man" are both nouns with the same morphological features (i.e. singular, male). However, the sentence "The girl went to school" must be translated to Arabic in a different manner, as "girl" is a feminine noun that inflects the Arabic verb for "went" with a feminine suffix. In some instances, it is possible that current PBSMT systems will incorrectly translate the sentence "The boy went to school" using the translated Arabic verb with a feminine suffix, which is against subject-verb-gender agreement in Arabic.

Aspects of the present disclosure relate to systems and methods of statistical machine translation that can convert the sentences of a given source language to another intermediate enriched morphology language, such that the translation from this language to a target language will be a translation from either a rich to rich morphology language or a rich to relatively poor morphology language. With reference to the example described herein, the source language sentences "the man went to school" and "the girl went to school" can be converted into two other sentences where "went" in both sentences is different. For example, in certain embodiments of the present disclosure, in the first sentence, "went" can be marked with a morphology tag that indicates that it is a singular, masculine, past tense verb, while in the second sentence, it can be marked with a morphology tag that indicates that it is a singular, feminine, past tense verb.

FIG. 1 depicts a high-level flow diagram for a statistical machine translation system, consistent with embodiments of the present disclosure. Aspects of FIG. 1 are directed toward a method for enriching the morphology of a source language, and translating the morphologically enriched source language text to a target language. Consistent with various embodiments, the method of statistical translation can include a translation operation 100 and a training operation 150. As shown, the translation operation 100 can include one or more corpora sources 102, a network 104, a source language text 106, a computer system 108, a morphologically enriched text 116, a statistical machine translation system 118, and a target language text 120.

As shown in FIG. 1, the translation operation 100 can include one or more corpora sources 102. For example, in certain embodiments, the corpora sources 102 can include, but are not necessarily limited to, computers, databases, and mobile devices. In certain embodiments, the corpora sources 102 can be communicatively connected to a network 104. The corpora sources 102 can provide a source language text 106 to a computer system 108 via the network 104.

Consistent with various embodiments, the computer system 108 can include an interface 110, a morphology analysis module 112, and a morphology enrichment module 114. The interface 110 can be configured to receive a source language text 106. For example, in certain embodiments, the interface 110 can be a website, and can allow for input of a source language text 106. The submitted source language text 106 can then pass to a morphological analysis module 112.

In certain embodiments, the morphological analysis module 112 can be configured to evaluate the morphology of the source language text, marking words in a source language text with a part-of-speech tag, parsing a sentence to determine syntactic dependence between words or phrases, and extracting morphological features of the source language text 106. The source language text 106 can then pass to a morphology enrichment module 114. In certain embodiments, the morphological enrichment module 114 can be configured to tag each word in the source language text 106 with a morphology tag from a second language that has rich morphology, and generate a morphologically enriched text 116. In certain embodiments, the morphology enrichment module 114 can tag each word in the source language text 106 based upon a model of established morphological and linguistic parameters (e.g., statistical morphology enrichment model 420 of FIG. 4) stored on a database, such as morphology enrichment database 162. The rich language morphology tags can contain morphological information such as a word's lexeme, word-classifying features (for example, gender for nouns and transitivity for verbs), word-altering features (for example, case for nouns and number for verbs), and non-standard forms of the word (such as orthographic variations, etc.)

As shown in FIG. 1, the morphologically enriched text 116 can pass from the computer system 108 to a statistical machine translation (SMT) system 118. Consistent with various embodiments, the SMT system 118 can translate the morphologically enriched source language text 118 to a desired target language, generating a target language text 120. For example, in certain embodiments, the SMT system 118 can translate a morphologically enriched English language text to Arabic. In certain embodiments, the SMT system can provide multiple possible target language translations with associated confidence levels. For instance, the SMT system can indicate that a first translation has an associated ninety-percent confidence level, a second translation has an associated eighty-five percent confidence level, and so on. In certain embodiments, the SMT system can automatically select a particular translation from the possible translations based upon the confidence level. In certain embodiments, the SMT system can automatically select a particular translation based on an analysis of the context of a language text. For example, when translating a particular word or a particular phrase in a sentence, the SMT system can analyze other words or other phrases that occur before and/or after the particular word or the particular phrase to determine the context of the particular word or the particular phrase. In this example, the SMT system can automatically select a translation from the possible translations based on the associated confidence level and based on the context.

Consistent with various embodiments, the method of statistical machine translation can include a training operation 150. As shown in FIG. 1, the training operation 150 can include one or more corpora databases 152, a network 154, a parallel bilingual text 156, a morphology learning system 160, a morphology enrichment database 162, feedback data 164, and a feedback generator 166.

Consistent with various embodiments, the corpora databases 152 can be communicatively connected to a network 154. In certain embodiments, the corpora databases can provide parallel bilingual corpora 156 to a morphology learning system 160 via the network 154. For example, in certain embodiments, the parallel bilingual corpora can include a poor morphology language text (such as English) and a rich morphology language text (such as Arabic). The morphology learning system 160 can be configured to evaluate the morphology of the poor morphology language text and the rich morphology language text. For example, in certain embodiments, the morphology learning system 160 can annotate both the rich morphology language text and the poor morphology language text with morphology tags, marking parts-of-speech, identifying syntactic dependence between words or phrases, and extracting morphological features of the poor morphology language text.

In certain embodiments, the morphology learning system 160 can align the poor morphology language text with the rich morphology language text, and project the morphology tags from the rich morphology language text to the morphologically poor language text. The morphology learning system 160 can be configured to generate a statistical morphology enrichment model based upon the evaluation of parallel bilingual corpora. For example, the statistical morphology enrichment model can provide guidelines and specifications directed toward annotating a morphologically poor language text with morphological information from a morphologically rich language text. In certain embodiments, the statistical morphology enrichment model can be stored in a morphology enrichment database 162. In certain embodiments, the morphology enrichment database 162 can be configured to allow the statistical morphology enrichment model to be accessed by a morphology enrichment module 108.

Consistent with various embodiments, the training operation 150 can also include a feedback generator 166 configured to receive a target language text 120. The feedback generator 166 can evaluate the target language text 120, and generate feedback data 164. For example, in certain embodiments, the feedback generator 166 can compare the target language text 120 with an accepted high-quality translation of the original source language text, and generate feedback data 164 based upon the comparison. The feedback data 164 can be provided to a morphology learning system 160 to further facilitate the machine translation process.

Figure 2:
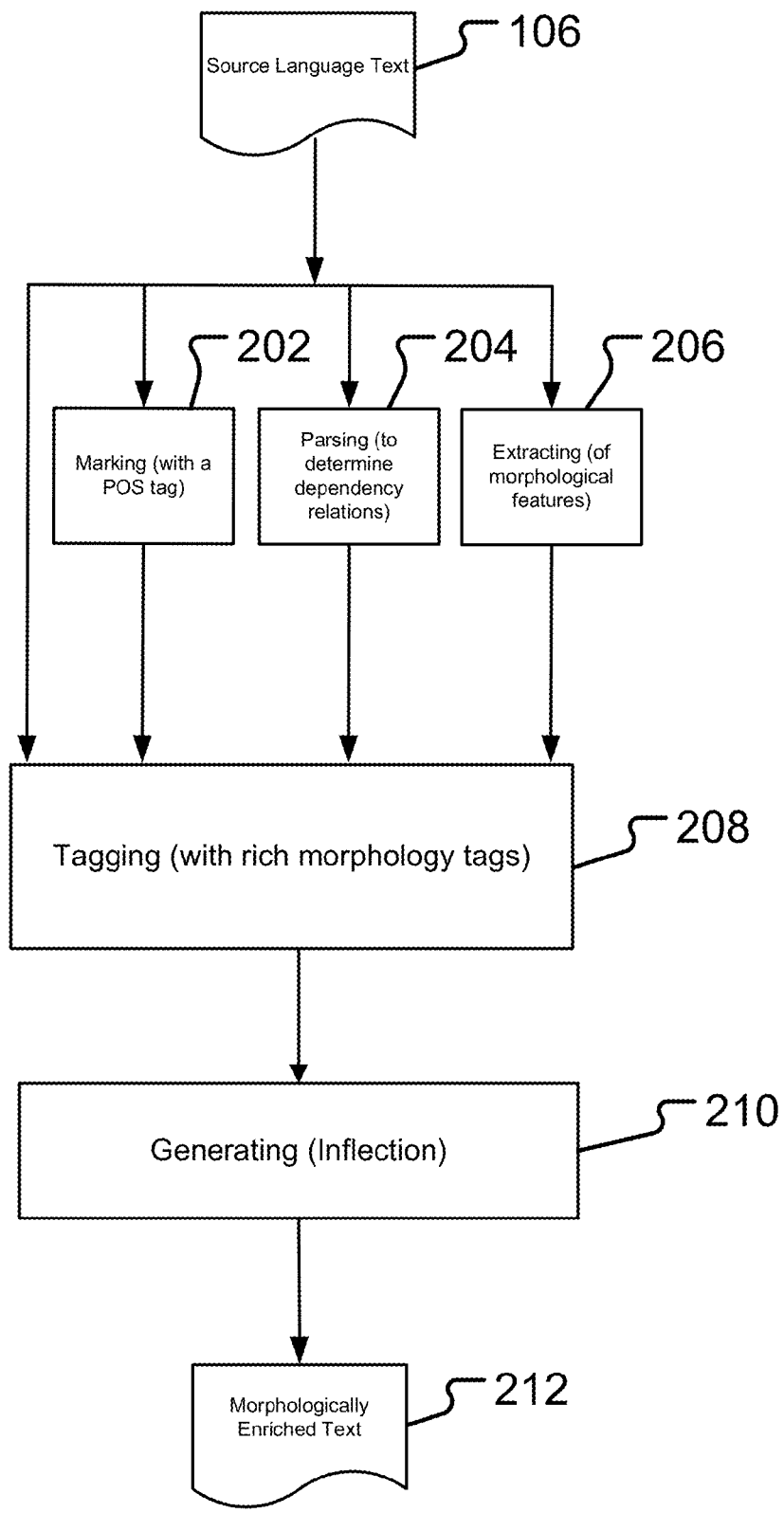
FIG. 2 depicts a flow diagram for a morphology enrichment method, consistent with embodiments of the present disclosure.

FIG. 2 depicts a flow diagram for a morphology enrichment method, consistent with embodiments of the present disclosure. Aspects of FIG. 2 are directed toward generating a morphologically enriched text 212 by enriching the morphology of a source language text 106. The morphology enrichment method can include a marking block 202, a parsing block 204, an extracting block 206, a tagging block 208, and a generating block 210. In certain embodiments, the morphology enrichment method can be implemented by a morphology enrichment module as part of a computer system, such as that of FIG. 1.

Consistent with various embodiments, the morphology enrichment method can include a marking block 202. Here, the words in the source language text 106 can be marked to indicate each word's corresponding part of speech, based on the word's definition and its context (i.e. relationship with adjacent and related words in a phrase, sentence, or paragraph). For example, in certain embodiments, a word can be marked as a noun, article, adjective, numeral, verb, adverb, pronoun, preposition, conjunction, or interjection. In certain embodiments, these part-of-speech markings can also allow for the distinction of further linguistic categories and sub-categories. For instance, when a word is marked as a noun, it can be further marked as plural, possessive, or singular. In certain embodiments, the language of the source text may also allow a noun to be marked for its case (i.e. role as subject, object, etc.), or grammatical gender, or a verb to be marked for its tense or aspect. Other part of speech categories and sub-categories are also possible.

Consistent with various embodiments, the morphology enrichment method can include a parsing block 204. Here, the source language text 106 can be analyzed to determine the grammatical structure of sentences. For instance, in certain embodiments, the parsing block 204 can determine which words are linked together as phrases, and which words are the subjects or objects of verbs. In certain embodiments, the parsing block 204 can include a probabilistic parsing algorithm that uses linguistic information gained from hand-parsed sentences to produce the most likely analysis of sentences in a source language text.

Consistent with various embodiments, the morphology enrichment method can include an extracting block 206. The extracting block 206 can analyze the source language text 106 to extract additional morphological features that can be used to enrich the morphology of the source language text 106. For example, in certain embodiments, the English word "plays" can be tagged as a "singular verb," however, when the word is preceded by "he," it can be tagged as a "singular masculine verb." The extracting block 206 can facilitate the identification of such morphological features.

In certain embodiments, the morphology enrichment method can include a tagging block 208. Consistent with various embodiments, the tagging block 208 can receive the output of the marking block 202, the parsing block 204, and the extracting block 206. The tagging block 208 can tag each word in the source language text 106 with a rich morphology tag. In certain embodiments, the rich morphology tag can be a morphology tag from a second language that has rich morphology. In certain embodiments, the tagging block 208 can tag each word in the source language text 106 based upon rules drawn from a database of established morphological and linguistic parameters, such as morphology enrichment database 162 of FIG. 1.

Consistent with various embodiments, the morphology enrichment method can include a generating block 210. The generating block 210 can receive the output of the tagging block 208. In certain embodiments, the generating block 210 can use the marked part-of-speech tag, parsed dependency relation information, extracted morphological features and rich morphology tags to generate an artificially inflected morphologically enriched form for each word in the source language text 106. For instance, in the phrase "He plays the violin," the verb "plays" can be inflected to "play_S_M_P," denoting the singular/masculine/present form of the verb "play." The artificially inflected form of each word in the source language text can be collectively output as a morphologically enriched text 212.

Figure 3:
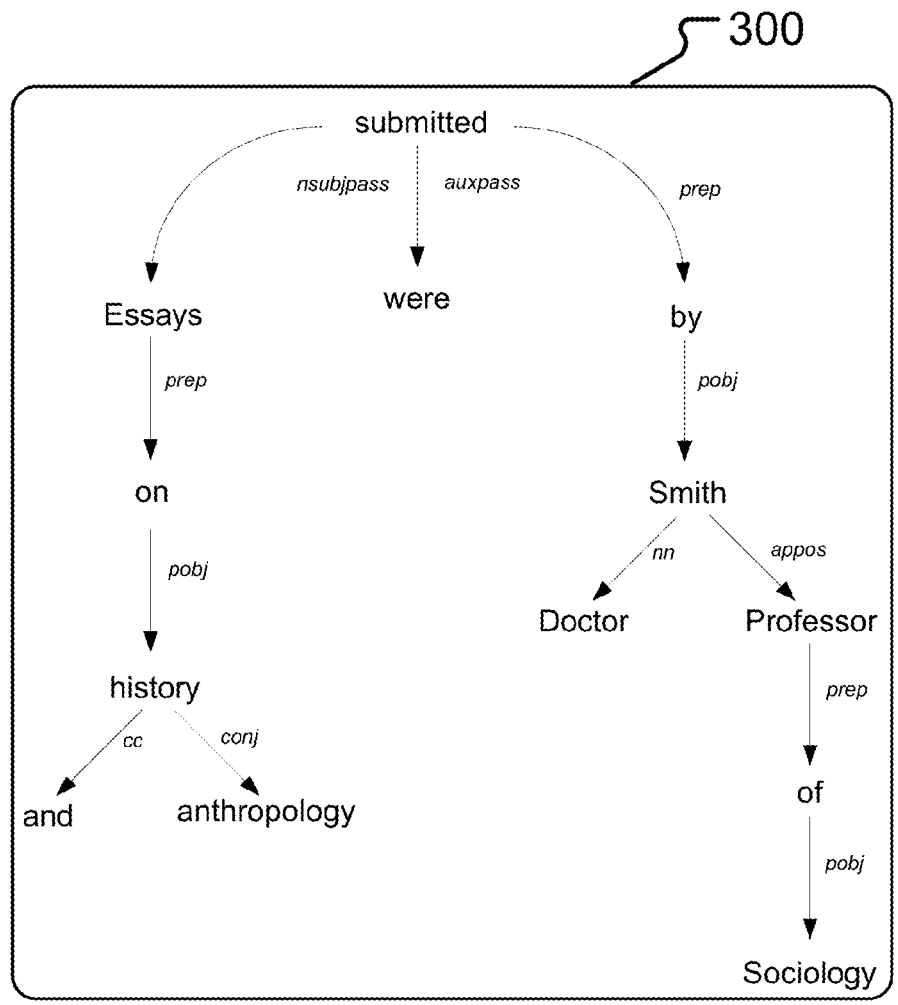
FIG. 3 depicts a dependency parsing module, consistent with embodiments of the present disclosure.

FIG. 3 depicts a dependency parsing module 300, consistent with embodiments of the present disclosure. Aspects of FIG. 3 are directed toward the parsing of dependency relations for a sentence of a source language text, such as source language text 106 of FIG. 1 and FIG. 2. Consistent with various embodiments, the dependency parsing module 300 can use a probabilistic parsing algorithm that uses linguistic information gained from hand-parsed sentences to produce an analysis of syntactical and grammatical relations between words in sentences of a source language text. For instance, FIG. 3 shows illustrative dependency relations for the example sentence, "Essays on history and anthropology were submitted by Doctor Smith, Professor of Sociology." The dependency parser 300 can provide dependency relation labels that indicate the relationship between pairs of words or phrases in a sentence. For example, these dependency relation labels can include nsubjpass (passive nominal subject), auxpass (passive auxiliary), prep (preposition), pobj (object of preposition), cc (coordination), conj (conjunction), nn (noun compound modifier), and appos (appositional modifier). Other dependency relation labels are also possible.

Figure 4:
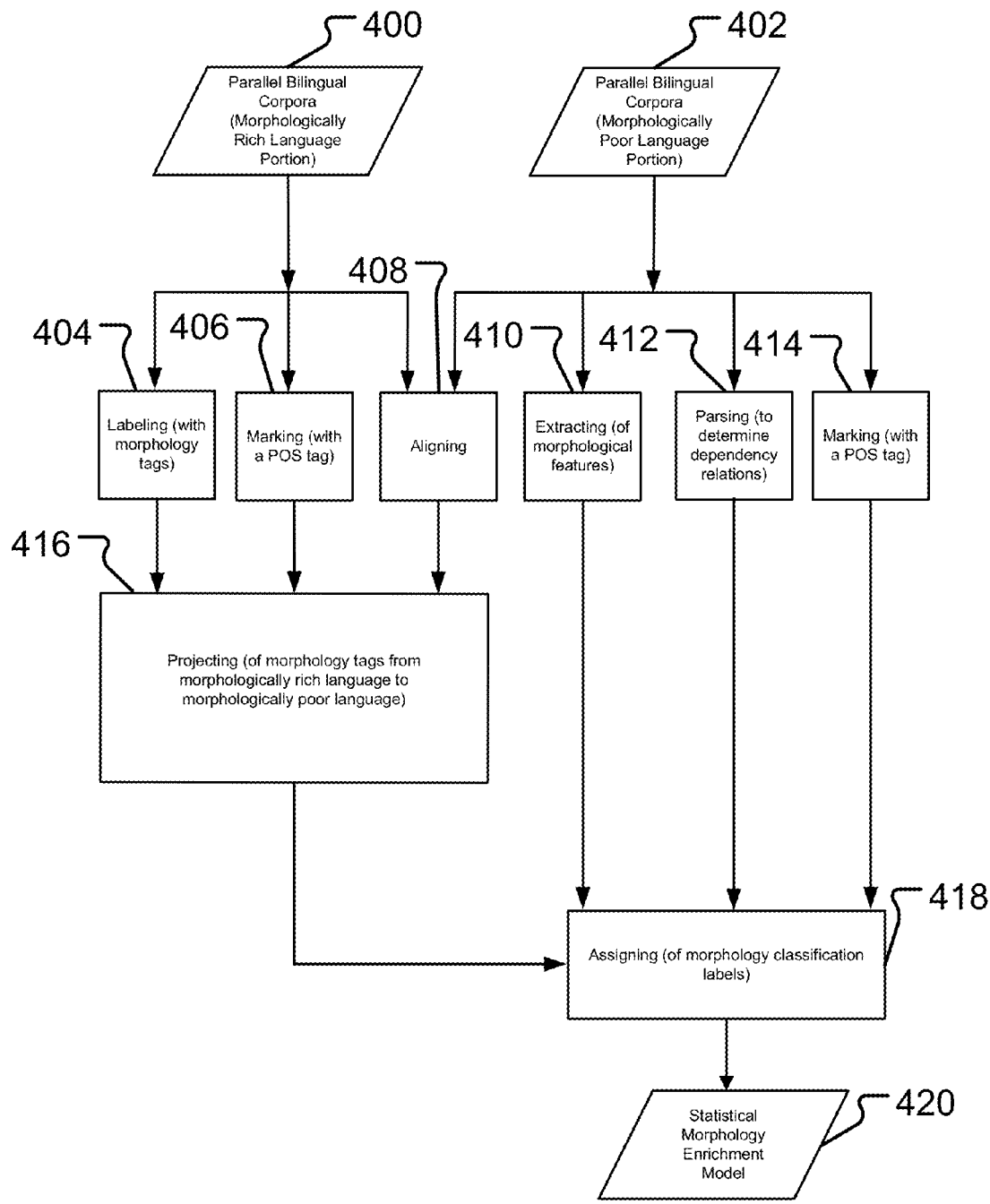
FIG. 4 depicts a flow diagram for a training method of a morphology learning system, consistent with embodiments of the present disclosure.

FIG. 4 depicts a flow diagram for a training method of a morphology learning system, consistent with embodiments of the present disclosure. Aspects of FIG. 4 are directed toward training a morphology learning system with linguistic information gained from an analysis of parallel bilingual corpora. The parallel bilingual corpora can include a morphologically rich language text portion 400 (hereafter, rich portion) and a morphologically poor language text portion 402 (hereafter, poor portion). In certain embodiments, the rich portion and the poor portion can be sentence aligned, such that each sentence in one portion of the parallel bilingual corpora has a translational equivalent sentence in the other portion of the corpora at the same sentence index (i.e. sentence #100 in the rich portion is the translational equivalent of sentence #100 in the poor portion). The morphology learning system training method can include annotating the rich portion 400 and the poor portion 402 with linguistic information tags (e.g. morphology tags, POS tags, etc.), mapping linguistic information tags from the rich portion 400 to the poor portion 402, and assigning morphology classification labels words in the poor portion 402. In certain embodiments, the morphology learning system can be utilized as part of a training operation, such as training operation 150 of FIG. 1.

In certain embodiments, the linguistic information tags can contain information about the part of speech or the grammatical category of the tagged words. For example, a word can be marked as a noun, adjective, numeral, verb, adverb, pronoun, preposition, or conjunction. In various embodiments, the grammatical categories can contain information about the tagged words' gender (e.g., masculine, feminine, common, neuter), animacy (e.g., animate, inanimate), number (e.g., singular, plural), case (e.g., nominative, genitive, dative, accusative, instrumental, locative, vocative), transitivity (e.g., intransitive, transitive), voice (e.g., active, passive, middle), verb form (e.g., infinitive, participle), tense (e.g., past, present, future), and person (e.g., first person, second person, third person).

Consistent with various embodiments, the process of annotating the parallel bilingual corpora can include a labeling block 404, a marking block 406, 414, an extracting block 410, and a parsing block 412. The process of mapping linguistic information tags can include an aligning block 408 and a projecting block 416. The process of assigning morphology classification labels can include an assigning block 418. In certain embodiments, the assigning block 418 can output a statistical morphology enrichment model 420 that can be used to facilitate tagging a morphologically poor language text with rich morphology tags (e.g., by a morphology enrichment module such as morphology enrichment module 114 of FIG. 1).

Consistent with various embodiments, the morphology learning system training method can include a marking block 406, 414. Here, the words in the morphologically rich language text portion 400 and the morphologically poor language text portion 402 can be marked to indicate each word's corresponding part-of-speech, based on the word's definition and its context (i.e. relationship with adjacent and related words in a phrase, sentence, or paragraph).

As shown in FIG. 4, the morphology learning system training method can include a labeling block 404. The labeling block 404 can label the morphologically rich language text portion with morphology tags. The morphology tags can contain morphological information such as a word's lexeme, word-classifying features (for example, gender for nouns and transitivity for verbs), word-altering features (for example, case for nouns and number for verbs), and non-standard forms of the word (such as orthographic variations, etc.)

In certain embodiments, the morphology learning system training method can include an extracting block 410. The extracting block 410 can analyze the morphologically poor language text portion 402 to extract additional morphological features that can be used to enrich the morphology of the morphologically poor language text portion 402.

Consistent with various embodiments, the morphology learning system training method can include a parsing block 412. Here, the morphologically poor language text portion 402 can be analyzed to determine the grammatical structure of sentences. For instance, in certain embodiments, the parsing block 412 can determine which words are linked together as phrases, and which words are the subjects or objects of verbs. In certain embodiments, the parsing block 412 can include a probabilistic parsing algorithm that uses linguistic information gained from hand-parsed sentences to produce the most likely analysis of sentences in a source language text.

Aspects of the present disclosure are directed toward a morphology learning system training method that can include an aligning block 408. The aligning block 408 can associate words in the morphologically poor language text 402 with words in the morphologically rich language text 400 that are translational equivalents. More particularly, the aligning block can identify a word in one portion of the parallel bilingual corpora and align it to its translational equivalent word in a corresponding sentence in the other portion of the parallel bilingual corpora (word aligning). In certain embodiments, a particular word in one portion of the parallel bilingual corpus can be aligned with one or more words in the corresponding sentence in the other portion of the corpus. In certain embodiments, a particular word in one portion of the parallel bilingual corpus may not be aligned with any words in the corresponding sentence in the other portion of the corpus.

Consistent with various embodiments, the morphology learning system training method can include a projecting block 416. Here, the linguistic information tags (e.g. part-of-speech tags, morphology tags, etc.) can be mapped from the morphologically rich language text portion 400 to the morphologically poor language text portion 402. In certain embodiments, the linguistic information tags can be mapped from words in the morphologically rich language text portion 400 to their word-aligned counterparts in the morphologically poor language text portion 402.

In certain embodiments, the morphology learning system training method can include an assigning block 418. The assigning block 418 can assign a morphology classification label to one or more words in the morphologically poor language text portion 402 based upon the linguistic information tags that are attached to it. In certain embodiments, the morphology classification labels can contain information regarding the morphological features of one or more words in the morphologically poor language text portion 402. In certain embodiments, the morphology learning system training method can output a statistical morphology enrichment model 420. The statistical morphology enrichment model 420 can include statistical linguistic information that facilitates the morphological enrichment of words in the morphologically poor language text portion 402. In certain embodiments, the statistical morphology enrichment model 420 can be stored on a database (e.g. morphology enrichment database 162 of FIG. 1) and accessed by a morphology enrichment module (e.g. morphology enrichment module 114 of FIG. 1) to tag a source language text with rich morphology tags.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A computer-implemented method of generating a machine translation of a first natural language text, comprising:

receiving, by at least one processor, via an interface communicatively coupled to the at least one processor, the first natural language text, wherein the first natural language text comprises a plurality of first language words;

generating, by the at least one processor, from the first natural language text, a marked text, dependency relation information, and a set of morphology features, wherein the marked text comprises words, among the plurality of first language words, marked with a respective part-of-speech tag, wherein the dependency relation information comprises syntactic dependence relationships between words among the plurality of first language words, and wherein each of the morphology features, included in the set of morphology features, is associated with a respective word among the plurality of first language words;

generating, by the at least one processor using the marked text, the dependency relation information, and the set of morphology features, a morphologically-enriched natural language text comprising an artificially-inflected form of each of the plurality of first language words, wherein the artificially-inflected form of each of the plurality of first language words comprises each of the plurality of first language words in combination with a respective at least one morphology tag associated with a morphology-rich language;

generating, by the at least one processor, from the morphologically-enriched natural language text, a second natural language text comprising, for each first language word included in the morphologically-enriched text, a respective second language translation, wherein each of the respective second language translations comprises at least one second language word, and wherein the generating the second natural language text comprises selecting each of the respective second language translations, from among a set of alternative second language translations, based at least in part on the artificially-inflected form of each of the plurality of first language words in the morphologically-enriched text; and outputting, by the at least one processor, the second natural language text.

2. The method according to claim 1, wherein the respective part-of-speech tag is selected from a group consisting of: noun, article, adjective, numeral, verb, adverb, pronoun, preposition, conjunction, or interjection.

3. The method according to claim 1, wherein generating the dependency relation information comprises at least one processor parsing the first natural language text using a natural language parsing algorithm.

4. The method according to claim 1, the method further comprising:

receiving, by the at least one processor, from a morphology learning system, a statistical morphology enrichment model; and generating, by the at least one processor, the morphologically-enriched natural language text further using the statistical morphology enrichment model.

5. The method according to claim 1, wherein the respective at least one morphology tag comprises at least one of a lexeme, gender, transitivity, case, plurality, and a non-standard form of a word among the plurality of first language words.

6. The method according to claim 1 further comprising:

receiving, by the at least one processor, from a corpora database, a parallel bilingual corpus, wherein the parallel bilingual parallel bilingual corpus comprises a morphology-poor natural language and a second morphology-rich natural language;

evaluating, by the at least one processor, the morphology-poor natural language and the second morphology-rich natural language;

generating, by the at least one processor, based on the evaluation, an annotated form of at least one of the morphology-poor natural language and the second morphology-rich natural language, each of the annotated forms comprising at least one of morphology tags, parts-of-speed markings, syntactic dependencies between words included in the respective morphology-poor natural language and second morphology-rich natural language, and morphological features of the morphologically-poor language;

generating, by the at least one processor, using the annotated forms, a statistical morphology enrichment model; and outputting, by the at least one processor, the statistical morphology enrichment model.

7. A system for machine translation, the system comprising:

at least one corpora source; and a computer system communicatively coupled by an interface to the at least one corpora source, wherein the computer system comprises at least one first processor, wherein the computer system is configured to receive, from the at least one corpora source via the interface, a first natural language text comprising a plurality of first language words, and wherein the at least one first processor is configured to:

generate, in response to the computer receiving the first natural language text, a marked text, dependency relation information, and a set of morphology features, wherein the marked text comprises words, among the plurality of first language words, marked with a respective part-of-speech tag, wherein the dependency relation information comprises syntactic dependence between words among the plurality of first language words, and wherein each of the morphology features, included in the set of morphology features, is associated with a respective word among the plurality of first language words;

generate, using the marked text, the dependency relation information, and the set of morphology features, a morphologically-enriched natural language text comprising an artificially-inflected form of each of the plurality of first language words, wherein the artificially-inflected form of each of the plurality of first language words comprises each of the plurality of first language words in combination with a respective at least one morphology tag associated with a first morphology-rich language; and output, the morphologically-enriched natural language text.

8. The system according to claim 7, wherein the respective part-of-speech tag is selected from a group consisting of: noun, article, adjective, numeral, verb, adverb, pronoun, preposition, conjunction, or interjection.

9. The system according to claim 7, wherein the at least one first processor is further configured to generate the dependency relation information by parsing the first natural language text using a probabilistic natural language parsing algorithm.

10. The system according to claim 7, wherein the respective at least one morphology tag comprises at least one of a lexeme, gender, transitivity, case, plurality, and a non-standard form of a word among the plurality of first language words.

11. The system of claim 7 further comprising a statistical machine translation system, wherein the statistical machine translation system comprises at least one second processor, wherein the at least one second processor is configured to:

receive, from the at least one first processor, the output morphologically-enriched natural language text;

generate a second natural language text comprising, for each first language word included in the morphologically-enriched text, a respective second language translation, wherein each of the respective second language translations comprises at least one second language word, and wherein the generating the second natural language text comprises selecting each of the respective second language translations from among a set of alternative second language translations, based at least in part on the artificially-inflected form of each of the plurality of first language words in the morphologically-enriched text; and output the second natural language text.

12. The system of claim 7 further comprising a corpora database, wherein the corpora database comprises at least one parallel bilingual parallel bilingual corpus, wherein the corpora database is communicatively coupled to the computer system, and wherein the at least one first processor is further configured to:

receive, from the corpora database, a parallel bilingual corpus, among the at least one parallel bilingual parallel bilingual corpus stored in the corpora database, wherein the parallel bilingual parallel bilingual corpus comprises a morphology-poor natural language and a second morphology-rich natural language;

evaluate the morphology-poor natural language and the second morphology-rich natural language;

generate, based on the evaluation, an annotated form of at least one of the morphology-poor natural language and the second morphology-rich natural language, each of the annotated forms comprising at least one of morphology tags, parts-of-speed markings, syntactic dependencies between words included in the respective morphology-poor natural language and second morphology-rich natural language, and morphological features of the morphologically-poor language;

generate, using the annotated forms, a statistical morphology enrichment model; and output the statistical morphology enrichment model.

* * * * *